United States Patent
Huang et al.

(10) Patent No.: US 6,346,330 B1
(45) Date of Patent: Feb. 12, 2002

(54) FORM-IN-PLACE GASKET FOR ELECTRONIC APPLICATIONS

(75) Inventors: Mitchell Huang, Austin, TX (US); William B. Stockton, Pleasanton, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/736,896

(22) Filed: Dec. 14, 2000

(51) Int. Cl.⁷ ............................................. B32B 27/38
(52) U.S. Cl. .................. 428/414; 523/466; 524/789; 524/790; 528/392; 528/393; 528/428
(58) Field of Search ................ 428/413, 414; 523/466; 524/789, 790; 528/392, 393, 428

(56) References Cited

U.S. PATENT DOCUMENTS

| | | | |
|---|---|---|---|
| 4,643,863 A | 2/1987 | Martini | 264/219 |
| 4,643,864 A | 2/1987 | Martini | 264/220 |
| 5,641,438 A | 6/1997 | Bunyan et al. | 264/403 |
| 5,679,734 A | 10/1997 | Peccoux et al. | 524/267 |
| 5,684,110 A | 11/1997 | Kawamura | 528/15 |

FOREIGN PATENT DOCUMENTS

| | | | | |
|---|---|---|---|---|
| EP | 0 643 552 A1 | 6/1994 | | H05K/9/00 |
| EP | 0 643 551 B1 | 5/2000 | | H05K/9/00 |

*Primary Examiner*—Margaret G. Moore
*Assistant Examiner*—D. Aylward
(74) *Attorney, Agent, or Firm*—Alan Ball; G. F. Chernivec; Gray L. Griswold

(57) ABSTRACT

A non-silicone, form-in-place gasket produced using automated placement followed by curing of a pattern of an extrudable thixotropic material comprising a liquid polyolefin oligomer a reactive diluent a thixotropic filler and a curative. The form-in-place gasket, after curing, has a compression set of about 7% to about 20%, a level of outgassing components of about 10 $\mu g/g$ to about 45 $\mu g/g$ and a Shore A hardness from about 45 to about 65.

18 Claims, No Drawings

FORM-IN-PLACE GASKET FOR ELECTRONIC APPLICATIONS

BACKGROUND OF THE INVENTION

1. Field of the Invention

The invention relates to gasket materials used for attaching and sealing covers to enclosures. More particularly, the invention relates to form-in-place gaskets, applied to surfaces of containers for sensitive electronic components. Gasket compositions, according to the present invention, are substantially free from deleterious effects of outgassing and ion contamination.

2. Discussion of the Related Art

Conventional methods for gasket manufacture substantially comprise either die-cutting the gasket out of an elastomeric sheet material, or shaping the gasket by injection-molding of an elastomeric mix or the like. Both these methods require expensive tools such as punches and molds, which add cost to the final product. Newer manufacturing methods deposit a bead or thread of a fluid elastomer from a nozzle onto a substantially planar surface. The pattern adopted by the fluid elastomer thread may be controlled using automated equipment, programmed according to selected coordinates to provide a gasket having a desired shape. After forming to a desired gasket pattern, the fluid elastomer thread may be cured, either at ambient temperature or in an oven, with or without accelerators or other additives.

Fluid elastomer compositions, suitable for form-in-place gaskets, include condensation-reaction curing silicone rubbers and addition-reaction curing silicone rubbers. These compositions have viscosities suitable for application using robot applicators which apply a sealing bead of material to at least one surface of at least one of the joining members. According to U.S. Pat. Nos. 4,643,863 and 4,643,864, fluid elastomers, suitable for controlled automated dispensing from a nozzle, include polyurethane, monocomponent or bicomponent silicone, and even polyvinylchloride compositions. An apparent disadvantage, of previously cited, nozzle-dispensed materials, is the need to provide support for the extruded bead of fluid elastomer. This problem was overcome with the development of a silicone rubber composition described in U.S. Pat. No. 5,684,110. Upon application of this silicone rubber composition to a substrate, it exhibits excellent resistance to distortion, under pressure, immediately after being applied and while curing to a highly pressure-resistant and strongly adhering silicone rubber gasket. In this case the silicone gasket composition cures via a combination of condensation-reaction curing and addition-reaction curing, the latter catalyzed with a platinum catalyst. The Patent (U.S. Pat. No. 5,684,110) further reveals that the silicone rubber composition is a two-part formulation requiring a first silicone containing fluid to be added to a second fluid, comprising a silicone and catalyst, with intimate mixing immediately before robot application.

Another two-part silicone formulation, disclosed in U.S. Pat. No. 5,679,734, relates to compositions, which can be crosslinked by hydrosilylation at room temperature, in the presence of a metal compound catalyst. Crosslinking proceeds via an addition reaction involving hydrogen substituents and alkenyl radicals of the vinyl type. Storage stability is achieved by providing a system having at least two component parts. Upon mixing the component parts, a gel forms between a few minutes to 1 hour 30 minutes depending on the cure temperature which may be between room temperature and 180° C.

Silicone materials, of the type previously discussed, meet the needs of a variety of applications including use as sealants, shock-absorbing elements, anti-vibration elements and gaskets in electrical and electronic components. One special and particularly interesting form of gasket is the electromagnetic interference (EMI) shielding gasket. EMI shielding gaskets perform the dual protective function of sealing cover assemblies and enclosures to prevent ingress of contaminants and, at the same time, exerting control over interference from electromagnetic energy. Protective sealants, effective in controlling EMI, may be used as gaskets that typically require a flexible, elastomeric, rubber-like matrix filled with a conductive material that is readily distributed throughout the flexible matrix. The conductive material may take the form of particles, flakes or fibers having intrinsic conductivity, or electrically conductive surface coatings. U.S. Pat. No. 5,641,438 discloses conductive sealant materials for application using form-in-place methods, which accomplish accurate positioning of the sealant bead. Similar compositions and methods are revealed in related published European applications, EP 0643551 and EP 0653552. Each reference describes EMI shielding sealant compositions, consisting of two or more components, requiring storage in separate containers and mixing just before applying and curing the gasket in place.

The previous discussion addressed primarily silicone-based fluid elastomer compositions suitable for use in a variety of applications including form-in-place gaskets. One disadvantage of using silicone elastomers is the presence of relatively low molecular weight siloxane contaminants in cured materials. Such contaminants tend to deposit on surfaces of an electronic assembly with the potential to cause device failure. Problems of contamination may be avoided using fluoroelastomer gaskets. Since they are subject to formation by injection molding, fluoroelastomer gaskets represent a costly approach for preventing contamination. Difficulties associated with non-fluid gaskets and fluid silicone elastomers, for gasket formation, suggests the need for a non-silicone, dispensable, fluid material for contaminant-free, low cost, sealing of containers of electronic components and associated devices.

SUMMARY OF THE INVENTION

The present invention provides fluid elastomer compositions having reactive functionality, preferably in the form of epoxy groups. Dispensable elastomer compositions provide dispensable, form-in-place gaskets designed for containers such as enclosures for hard disk drives. For accuracy of dimensions, placement and final positioning, various patterns of form-in-place gaskets, according to the present invention, require the dispensing of elastomer compositions using automated liquid dispensing followed by in-place curing to soft, resilient gaskets, exhibiting moisture resistance, minimal compression set, and adhesion to selected substrates. The elastomer composition, before curing, should have sufficiently low viscosity to be readily dispensed. Curable compositions may be prepared as one-part formulations that include a curative or as two-part formulations requiring addition of a curative before curing. Regardless of the components included in an uncured gasket composition, the curing process may be initiated thermally, photonically, a combination of both, and/or, in the case of two part formulations, by simply combining the parts under ambient conditions. Preferably uncured formulations provide non-slumping dispensed beads of gasket material having good dimensional stability, as applied, with essentially no change in shape or position during and after curing.

For electronics grade cleanliness, properties of these elastomer compositions, after curing, include low outgassing and low extractable ionics. These properties surpass those of commercially available, silicone-based form-in-place gaskets which, as previously discussed, typically contain low molecular weight siloxanes that can damage electronic components following contamination of device surfaces. Since this invention utilizes a flexible epoxy based material, possible damage due to siloxane contamination is avoided.

More particularly the present invention provides a non-silicone composition for form-in-place gaskets comprising a liquid polyolefin oligomer, a reactive diluent, a thixotropic filler, and a curative. The non-silicone composition, after curing, has a compression set of about 7% to about 20%, preferably about 10% to about 15%, a level of outgassing components of about 10 $\mu g/g$ to about 45 $\mu g/g$ and a Shore A hardness from about 45 to about 65 preferably from about 50 to about 60.

Non-silicone compositions according to the present invention may be dispensed using a variety of methods and equipment including commercially available fluid dispensing equipment. Gasket dispensing and placement may involve a variety of different methods. Speedline Technologies Inc. offers suitable commercial liquid dispensing equipment under the tradename CAMALOT, e.g. CAMALOT 1414 and CAMALOT 1818.

The present invention further includes a non-silicone, form-in-place gasket produced using automated placement, followed by curing, of a pattern of an extrudable thixotropic non-silicone composition. The extrudable composition comprises, a liquid polyolefin oligomer, a reactive diluent, a thixotropic filler, and a curative. The form-in-place gasket, after curing, has a compression set from about 7% to about 20%, preferably from about 10% to about 15%, a level of outgassing components from about 10 $\mu g/g$ to about 45 $\mu g/g$, and a Shore A hardness between about 45 and about 65, preferably between about 50 and 60.

Definitions

The term "dispensable" means that low viscosity elastomer compositions may be conveniently extruded from tubes, such as needles, attached to pressurized reservoirs, to provide small diameter (~1 mm) beads of sealant following the contours of a required gasket pattern.

The combination of terms "one-part, cure-in-place" refers to fluid elastomer compositions containing a curative that responds to heat or actinic radiation to promote crosslinking and curing of the one-part formulation, once dispensed onto its substrate.

The term "non-slumping" refers to the properties of an elastomer composition, including yield stress and viscosity that deter sagging or slumping during dispensing and curing. A non-slumping material is important for maintaining cross-sectional profile stability of a dispensed bead, of elastomer composition, before and during curing.

The term "aspect ratio" indicates the slumping tendency or dimensional stability of a gasket composition according to the present invention by measuring the height and width of a cross-section through a cured, extruded bead of the composition. A cross sectional height divided by the corresponding width provides a value of "aspect ratio" of a cured gasket bead.

The term "hydrophobic" relates to the water repellency of elastomer compositions, which provide sealing gaskets with moisture barrier properties.

The term "electronics-grade cleanliness" means that cured elastomeric compositions for form-in-place gaskets satisfy electronics industry requirements such as low levels of outgassing and extractable ionic contaminants. Experimental investigation by dynamic headspace gas chromatography (GC)/mass spectrometry shows a total outgassing of about 10 $\mu g/g$ to about 45$\mu g/g$ for cured elastomer compositions, according to the present invention, when held at 85° C. for three hours.

The term "flowability" of uncured gasket material, as used herein, refers to the amount of material passing through an opening of fixed diameter under a fixed pressure for a selected time interval. "Flowability" is expressed as the weight of material exiting through the orifice during the time that pressure was applied.

The term "outgassing" relates to the collection of volatile components produced by evacuation of cured non-silicone gasket compositions according to the present invention. Established criteria require microgram ($\mu g$) quantities of volatile components for each ram (g)of composition evaluated.

DETAILED DESCRIPTION OF THE INVENTION

Dispensable elastomeric formulations, according to the present invention, provide form-in-place gaskets designed for containers such as enclosures for hard disk drives. Suitable elastomeric formulations may be applied to such containers using automated liquid dispensing followed by in-place curing to soft, resilient gaskets, exhibiting moisture resistance, minimal compression set, and adhesion to selected substrates. The primary use for resilient gaskets, after curing is to provide sealed interfaces between surfaces of protective containers. An effective seal prevents access of contaminants to protected structures.

The present invention provides epoxy-functional, form-in-place gasket formulations that overcome the disadvantages associated with commercially available silicone-based materials. Cured silicone- containing gaskets have low molecular weight siloxane contaminants that may deposit on device surfaces with resultant damage to sensitive electronic components. The cured flexible epoxy-based gaskets of the present invention are free of siloxane-containing species, being formed from dispensable fluid formulations comprising linear hydrocarbon oligomers having epoxy functionality for crosslinking using anhydride curing agents. Selection of liquid oligomers, also referred to herein as prepolymers, as a component of a sealing gasket, requires inherent properties of hydrophobicity and low ionic content. The reactive functionality, e.g. epoxy substituents, preferably promote crosslinking of gasket formulations by heat activation.

When used for sealing containers of electronic components, the cured, form-in-place gasket becomes compressed under the mechanical force applied to close the container. Design criteria control the allowable closure force and gasket hardness for secure seating of one part of the container relative to another. Cured gasket materials have Shore A durometer values from about 45 to about 65, preferably from about 50 to about 60 to enable full closure with a reasonable amount of force. To accommodate the possible use of electronic assemblies in differing climatic regions, cured gaskets, according to the present invention, maintain their elastomeric properties over a temperature range extending from about −40° C. to about 100° C. The possibility of re-entry into the container, for re-work, requires that the cured gasket has a low permanent compression set. Suitable form-in-place gasket formulations exist in a range, of permanent compression set, from about 7% to about 20% of the original deflection, measured by ASTM D395B. Low values of permanent compression set assure the resiliency of the gasket material for maintaining an adequate seal during the lifetime of the container and facilitating gasket reuse if the container is reopened for rework of protected electronic assemblies.

While mechanical force increases the contact between a cured gasket and surfaces of the container, the physical properties of the gasket itself also prevent access of environmental contaminants, such as moisture vapor, into the container. A key property is hydrophobicity that may be attributed to the use of a liquid prepolymer that includes an epoxidized polyolefin backbone. Hydrophobic liquid prepolymers impart hydrolytic stability and minimal moisture absorption to cured gaskets. In addition to repelling external contaminants, the gasket itself should not represent a potential source of contamination. This requires that the hydrophobic gasket material shows remarkable stability and freedom from volatile components that could escape, via outgassing, to deposit on electronic components in the container with resultant potential for corrosion or other damaging conditions. Stringent cleanliness is a requirement of electronics manufacturers, particularly in the hard disk drive industry. Therefore, the cured gasket should contain minimal amounts of impurities and volatile components. Gasket formulations typically require cure times of about two hours at 160° C. Additional reduction of outgassing can occur via a post-bake process after curing.

For optimum performance in a designated application, form-in-place gaskets preferably possess a balance of properties. Uncured gasket formulations should be liquid with a low enough viscosity for easy dispensing, yet remain non-slumping, after dispensing, to maintain the shape and dimensions of a selected gasket pattern. After curing, softness properties, low compression set, and minimal outgassing are required. Property adjustment in the uncured and cured state is a function of reactants, relative stoichiometry of reactants, concentration and type of filler and curing conditions. Low filler concentrations favor lower viscosity formulations for improved dispensability. Unfortunately, formulations with insufficient filler amounts typically result in gasket beads that slump excessively after being dispensed. Softer materials can also be obtained by making the matrix resin softer. However, softening the matrix resin material usually leads to some sacrifice in compression set. Each property may vary depending upon material selection and stoichiometry, filler type and concentration, and conditions used for crosslinking a formulation to yield the cured gasket. The balance of properties will vary in response to the specific requirements of a given application for form-in-place gaskets. Custom formulating becomes an essential task for satisfying the many applications for gasket formulations according to the present invention.

Considering the need to provide custom, application-specific formulations, the focus of the present invention is form-in-place gaskets as seals for containers of hard disk drive assemblies. The properties of gasket formulations, suitable for use with hard disk drive containers, include good sag resistance of uncured material after being dispensed, low compression set, ready compressibility with normal closure forces, substantial freedom from contaminants, and good adhesion to target surfaces. Table 1 shows typical properties for preferred gasket formulations used with hard disk drive containers. The formulations adhere well to aluminum and stainless steel, while exhibiting moisture resistance, with low moisture vapor transport, as required for an environmental seal.

Suitable liquid oligomers, include substantially linear polyolefins such as L 207, a commercially available epoxidized Kraton from Shell Chemical Company. This dual functional polyolefin consists of a poly(ethylene/butylene) backbone with hydroxyl functionality at one end and a multiple epoxidized polyisoprene functionality at the other end. The flexible aliphatic portion imparts low temperature flexibility as well as hydrophobicity. The multiple-epoxidized end allows for epoxy-type curing and network formation.

Preferred curing agents, according to the present invention, are liquid anhydrides (available from Lonza Inc.), such as AC39-polypropylene glycol di(dodecenyl succinate); dodecenyl succinic anhydride (DDSA); methyl tetrahydro-phthalic anhydride (MTHPA); methyl-5-norbornene-2,3,-dicarboxylic anhydride (AC methyl); methylhexahydro-phthalic anhydride (MHHPA) and combinations thereof. Liquid maleic anhydride grafted polybutadiene (available from Ricon Chemicals) may also be used as a curing agent.

Addition of a reactive diluent, such as PRIPOL 2033, a polyolefin diol, reduces viscosity of the overall formulation and also maintains performance properties by reacting into the network structure. Other reactive diluents include hydroxyl functional compounds, such as hydroxyl terminated poly(ethylene/butylene), available as L-2203 from Shell Chemical; hydroxyl terminated polybutadiene resin available as R-20 LM from Elf Atochem; low viscosity epoxy functional compounds, such as diglycidyl ether of 1,4-butanediol available as HELOXY MODIFIER 67 from Shell Chemical; and diglycidyl ether of neopentyl glycol available as HELOXY MODIFIER 68 from Shell Chemical.

Preferably, non-slumping form-in-place gasket formulations include filler particles known to produce thixotropic materials. After dispensing in a pre-determined pattern, these filled formulations maintain their profile and dimensions through thermal curing. Suitable fillers according to the present invention include clays, a variety of forms of silica, depending upon particle size and surface treatment, and organic fillers such as cellulose, castor-oil wax, and polyamide-containing fillers. Particulate fillers, imparting thixotropy, include fumed silica, clay, and carbon black. Suitable fumed silicas include AEROSIL R812; and AEROSIL R805 (both available from Degussa); CAB-O-SIL TS 610; and CAB-O-SIL T 5720 (both available from Cabot Corp.). Preferred clays include GARAMITE 1958, available from Southern Clay Products. Carbon blacks, such as COLOUR BLACK FW 18 (Degussa); and PRINTEX 55 also contribute to thixotropy. Fumed silicas generally represent the most preferred fillers although this is somewhat formulation dependent.

Optimum rheological performance occurs with proper dispersion of the filler. Shear conditions, during mixing of form-in-place gasket formulations, approach an optimum state to produce material for uncured gaskets that hold their shape after dispensing. High shear mixing can permanently disrupt the network structure of the thixotropic particles with resultant loss of shape by increased slumping of dispensed gasket beads. A low-shear mixer reduces this problem to a minimum, and is preferred for preparing formulations according to the present invention.

Zinc catalysts have been used successfully to catalyze the anhydride-epoxy cure. Suitable zinc catalysts include zinc ethyl hexanoate (ZnHex), zinc neodecanoate, zinc undecylenate, and zinc stearate (ZnSt).

Details of form-in-place gasket formulations, disclosed herein, are merely exemplary of the invention that may be subject to other variations that also depend upon the introduction of characteristics, such as improved vibration dampening, thermal cycling, low outgassing etc. to liquid polymers having a flexible backbone and terminal reactive functionality. Additional advantages and modifications will readily occur to those skilled in the art. Accordingly, various modifications may be made without departing from the spirit or scope of the general inventive concept as defined by the appended claims and their equivalents.

MATERIAL DESCRIPTIONS

L207—Epoxy functional olefin available from Shell Chemical Company. Its structure includes an epoxy functional end group separated from a primary hydroxyl functionality by a poly(ethylene/butylene) backbone. L207 has an epoxy equivalent weight (EEW) of 590 and a hydroxyl equivalent weight of 6,600.

PRIPOL 2033, a dimer diol (Unichema), has an hydroxyl equivalent weight (HEW) of 278.

L-2203 is a hydroxyl functional poly(ethylene/butylene) having a hydroxyl equivalent weight of 1700 as supplied by Shell Chemical Company.

AC-39 is a polypropylene glycol di(dodecenylsuccinate) from Lonza Inc.

DDSA (AEW 266) is dodecenyl succinic anhydride (M.Wt. —350) available from Milliken Chemical.

BYK052 is an organic defoamer from BYK-Chemie USA.

Zinc stearate (ZnSt) is available from Alfa Aesar and Zinc 2-ethylhexanoate is available from Strem Chemicals.

R805 is a hydrophobic treated fumed silica available from Degussa-Huls.

TABLE 1

Typical Gasket Properties

| Property | Value | Test Method |
|---|---|---|
| Compression Set | 7% to 20% | ASTM D395B |
| Hardness (Shore A) | 45–65 | Shore A Durometer |
| Total Outgassing | 10 µg/g to 45 µg/g | GC/Mass Spec. |
| Flowability (g) | 0.24 to 0.42 | Fixed Time and Pressure Dispensing |
| Aspect Ratio | 0.50 to 0.90 | Cross Section Analysis |
| Tg | −40° C. to −46° C. | DSC |

Form-In-Place-Gasket Material Compounding

Raw materials were mixed together in a double planetary vacuum mixer. After mixing was completed, the material was discharged into 30 cc syringes and stored in a freezer at a temperature of −40° C. until needed. Prior to using material from a syringe, the frozen material was thawed at room temperature for about two hours.

Experimental Methods

Description of ASTM D395 B

Cylindrical disc specimens with a thickness of approximately 6 mm and a diameter of 13 mm are compressed 25% of the original thickness and held at that compressed thickness between two flat plates, bolted together. The compressed samples are then placed in an oven at 70° C. for 70 hours. After completing the heat conditioning, the samples are immediately removed from the compression assembly and allowed to equilibrate at room temperature for 1 hour before measuring the final thickness. The compression set is calculated as the percentage of the original deflection as follows:

C=(Original sample thickness)−(final sample thickness) (Original sample thickness)−(Compressed sample thickness in test assembly)

Description of Shore A Hardness

Samples with a thickness of about 6 mm were tested for hardness by using a Shore A durometer tester at room temperature.

Description of Outgassing TM

Cured samples were outgassed using a dynamic headspace oven apparatus at 85° C. for 3 hours. The collected volatiles were analyzed using thermal desorption gas chromatography interfaced with a mass spectrometer detector.

Flowability Testing

The flowability of a material, as used herein, measures the amount of material output under a fixed pressure and time interval, through an opening of fixed diameter. Flowability of uncured formulations was evaluated using an EFD 1500 Dispenser with time and pressure control. Material was dispensed from a 30 cc reservoir (syringe), through an orifice (needle tip 14tt from EFD) having a diameter of 1.6 mm(0.063 inch). A pressure of 413.4 Kpascals (60 psi) was applied to the reservoir for a duration of 20 seconds. The weight of material passing through the orifice under pressure was recorded.

Description of Tg method

The glass transition temperature (Tg) of cured specimens was determined using a differential scanning calorimeter (DSC). The Tg was selected as the midpoint in the transition region between the glass and rubbery temperature regions in the DSC heating scan.

Description of Aspect Ratio Analysis

Dimensional stability of a dispensed gasket was assessed by measuring the height and width of a cured gasket bead that had been dispensed at 413.4 Kpascals (60 psi) through a 14tt syringe tip (1.6 mm opening) available from EFD. The syringe tip was held 9.5 mm (0.375 inch) from a substrate while the syringe was slowly moved at about 5.0 mm/sec (0.20 inch/sec) to allow the bead of material to gently fall upon the substrate. The dispensed bead was then cured at 160° C. for two hours. A small length of the bead was then sliced with a razor blade to obtain a cross section which was examined under a microscope to measure the bead height and width. The aspect ratio was determined by dividing the bead height by the bead width.

Description of Lap-Shear Adhesion to Aluminum

Lap-shear adhesion (ASTM D1002) was evaluated by curing the form-in-place-gasket (FIPG) material between aluminum specimens with thicknesses of 0.53 mm (0.021 inch). The thickness of the FIPG material was approximately 1.14 mm (0.045 inch). Lap-shear specimens were tested on an Instron tensile tester at a separation rate of 1.27 mm/minute (0.05 inch/minute).

TABLE 2

Formulation Examples 1–6

| Material | 1 | 2 | 3 | 4 | 5 | 6 |
|---|---|---|---|---|---|---|
| L-207 | 54.8 | 55.8 | 59.4 | 60.0 | 60.6 | 60.9 |
| AC-39 | 18.3 | 24.6 | — | — | — | — |
| DDSA | 12.2 | — | 18.3 | 16.5 | 18.3 | 15.2 |
| R805 | 13.7 | 9.5 | 9.8 | 10.8 | 11.0 | 11.0 |
| PRIPOL 2033 | — | 9.5 | 12.2 | 12.0 | 9.1 | 12.2 |
| ZnSt | 0.9 | 0.6 | 0.3 | | 0.9 | 0.6 |
| ZnHex | — | — | — | 0.6 | — | — |
| BYK-O52 | 0.1 | 0.1 | 0.1 | 0.1 | 0.1 | 0.1 |

TABLE 3

Properties of Formulation Examples 1–6

| Property | 1 | 2 | 3 | 4 | 5 | 6 |
|---|---|---|---|---|---|---|
| Shore A Hardness | 52.0 | 45.0 | 57.0 | 58.0 | 61.0 | 58.0 |
| Compression Set | 18.4 | 13.7 | 13.6 | 10.7 | 7.7 | 11.5 |
| Flowability | 0.25 | 0.41 | 0.40 | 0.34 | 0.25 | 0.28 |
| Aspect Ratio | 0.86 | 0.84 | 0.70 | 0.84 | 0.80 | 0.78 |
| Total outgassing | 13 | 39 | 23 | — | 32 | 21 |
| Tg | −45 | — | −40 | — | −45 | −46 |
| Lap shear adhesion | 47 | — | 41 | — | — | 15 |

Table 2 and Table 3 provide formulations according to the present invention and properties desired of materials suitable for form-in-place gaskets. Automatic dispensing equipment may be used to provide non-slumping gasket beads curable by application of heat.

TABLE 4

Comparative Examples C1–C4

| Material | C1 | C2 | C3 | C4 |
|---|---|---|---|---|
| L-207 | 54.8 | 58.3 | 60.0 | 62.4 |
| DDSA | 18.3 | 17.5 | 18.3 | 12.2 |
| R805 | 11.3 | 10.2 | 2.2 | 9.8 |
| PRIPOL 2033 | 15.2 | — | 9.1 | 15.2 |
| L-2203 | — | 13.1 | — | — |
| ZnSt | 0.3 | — | 0.3 | 0.3 |
| ZnHex | — | 0.9 | — | — |
| BYK-O52 | 0.1 | 0.1 | 0.1 | 0.1 |

TABLE 5

Properties of Comparative Examples C1–C4

| Property | C1 | C2 | C3 | C4 |
|---|---|---|---|---|
| Shore A Hardness | 47.0 | 59.0 | 64.0 | 41.0 |
| Compression Set | 28.6 | 11.6 | 8.3 | 39.3 |
| Flowability | 0.37 | 0.37 | 0.25 | 0.34 |
| Aspect Ratio | 0.83 | 0.28 | 0.88 | 0.78 |
| Total outgassing | 31 | 44 | 93 | 18 |
| Tg | — | — | −46 | −44 |
| Lap shear adhesion | — | — | 41 | 56 |

TABLE 6

Comparative Examples C5–C8

| Material | C5 | C6 | C7 | C8 |
|---|---|---|---|---|
| L-207 | 63.0 | 64.9 | 69.9 | 76.8 |
| DDSA | 15.2 | 12.2 | 18.2 | 10.0 |
| R805 | 12.2 | 12.2 | 11.2 | 12.3 |
| PRIPOL 2033 | 9.1 | 9.1 | — | — |
| ZnSt | 0.3 | 1.5 | 0.7 | 0.8 |
| BYK-O52 | 0.1 | 0.1 | 0.1 | 0.1 |

TABLE 7

Properties of Comparative Examples C5–C8

| Property | C5 | C6 | C7 | C8 |
|---|---|---|---|---|
| Shore A Hardness | 66.0 | 64.0 | 62.0 | 64.0 |
| Compression Set | 9.3 | 13.3 | 12.9 | 11.7 |
| Flowability | 0.22 | 0.19 | 0.22 | 0.16 |
| Aspect Ratio | 0.84 | 0.86 | 0.29 | 0.35 |
| Total outgassing | 49 | 34 | — | — |
| Tg | −46 | −44 | — | — |
| Lap shear adhesion | — | 14 | — | — |

Tables 4–7 include comparative examples C1–C8 showing how certain properties, by falling outside of a desired range, impair the performance of these examples for form-in-place sealing gaskets. A balance of properties provides the key to successful performance of gasket materials according to the present invention. However, individual properties can provide indicators of potential failure. Comparative examples C3, C5,C6,C7 and C8 have Shore A Hardness values greater than about 60. Such values are above the preferred range. Undesirable low flowability appears as a characteristic of comparative examples C6, C7 and C8 while C2, C7 and C8 exhibit low values for aspect ratio. Another indicator of poor gasket performance is shown by examples C1, and C4 that exhibit elevated values of compression set.

What is claimed is:

1. A form-in-place gasket produced using automated placement followed by curing of a pattern of a thixotropic non-silicone composition comprising:

a liquid polyolefin oligomer;

a reactive diluent;

a thixotropic filler; and a curative, said form-in-place gasket, after curing, having a compression set of about 7% to about 20%, a level of outgassing components of about 10 $\mu$g/g to about 45 $\mu$g/g and a Shore A hardness from about 45 to about 65.

2. A form-in-place gasket according to claim 1 wherein said non-silicone composition is a non-slumping composition.

3. A form-in-place gasket according to claim 1 wherein said compression set is from about 10.0% to about 15.0%.

4. A form-in-place gasket according to claim 1 wherein said level of outgassing components is from about 20 $\mu$g/g to about 35 $\mu$g/g.

5. A form-in-place gasket according to claim 1 wherein said Shore A hardness is from about 50 to about 60.

6. A form-in-place gasket according to claim 1 having an aspect ratio from about 0.6 to about 0.95.

7. A form-in-place gasket according to claim 1 comprising about 50 wt. % to about 65 wt. % of said liquid polyolefin oligomer.

8. A form-in-place gasket according to claim 1 comprising about 7.5 wt. % to about 15 wt. % of said reactive diluent.

9. A form-in-place gasket according to claim 1 comprising about 8.0 wt. % to about 12.0 wt. % of said thixotropic filler.

10. A form-in-place gasket according to claim 1 wherein said thixotropic filler is a fumed silica.

11. A non-silicone composition for form-in-place gaskets comprising:

a liquid polyolefin oligomer;

a reactive diluent;

a thixotropic filler; and a curative, said non-silicone composition, after curing, having a compression set of about 7% to about 20%, a level of outgassing components of about 10 µg/g to about 45 µg/g and a Shore A hardness from about 45 to about 65.

12. A non-silicone composition according to claim 11 comprising about 50 wt. % to about 65 wt. % of said liquid polyolefin oligomer.

13. A non-silicone composition according to claim 11 comprising about 7.5 wt. % to about 15 wt. % of said reactive diluent.

14. A non-silicone composition according to claim 11 comprising about 8.0 wt. % to about 12.0 wt. % of said thixotropic filler.

15. A non-silicone composition according to claim 11 wherein said compression set is from about 10% to about 15%.

16. A non-silicone composition according to claim 11 wherein said Shore A hardness is from about 50 to about 60.

17. A non-silicone composition according to claim 11 wherein said non-silicone composition is a non-slumping composition.

18. A non-silicone composition according to claim 9 having a flowability from about 0.25 to about 0.5.

* * * * *